(12) United States Patent
Sato et al.

(10) Patent No.: US 9,813,769 B2
(45) Date of Patent: Nov. 7, 2017

(54) DISPLAY DEVICE, INFORMATION ACQUISITION METHOD, AND INFORMATION PROVIDING METHOD

(71) Applicant: SONY CORPORATION, Tokyo (JP)

(72) Inventors: Naoyuki Sato, Tokyo (JP); Yoshiharu Dewa, Tokyo (JP)

(73) Assignee: Sony Corporation, Tokyo (JP)

(\*) Notice: Subject to any disclaimer, the term of this patent is extended or adjusted under 35 U.S.C. 154(b) by 0 days.

(21) Appl. No.: 14/277,435

(22) Filed: May 14, 2014

(65) Prior Publication Data

US 2015/0012952 A1   Jan. 8, 2015

(30) Foreign Application Priority Data

Jul. 2, 2013 (JP) ................................. 2013-138790

(51) Int. Cl.
| | |
|---|---|
| H04N 21/4722 | (2011.01) |
| H04N 21/41 | (2011.01) |
| H04N 21/43 | (2011.01) |
| H04N 21/4725 | (2011.01) |
| H04N 21/643 | (2011.01) |
| H04N 21/81 | (2011.01) |
| H04N 21/858 | (2011.01) |
| H04L 29/08 | (2006.01) |

(52) U.S. Cl.
CPC ..... *H04N 21/4722* (2013.01); *H04N 21/4126* (2013.01); *H04N 21/4307* (2013.01); *H04N 21/4725* (2013.01); *H04N 21/64322* (2013.01); *H04N 21/8133* (2013.01); *H04N 21/858* (2013.01); *H04L 67/02* (2013.01)

(58) Field of Classification Search
CPC ............ H04N 21/478; H04N 21/4782; H04N 21/8586; H04N 21/4722; H04N 21/436; H04N 21/4126; H04N 21/4307; H04N 21/858
See application file for complete search history.

(56) References Cited

U.S. PATENT DOCUMENTS

2011/0167468 A1\* 7/2011 Lee ..................... H04N 21/4126
725/132
2012/0054816 A1\* 3/2012 Dewa ........................... 725/116
(Continued)

FOREIGN PATENT DOCUMENTS

JP   2005-333371   12/2005

*Primary Examiner* — Pankaj Kumar
*Assistant Examiner* — Alexander Boyd
(74) *Attorney, Agent, or Firm* — Paratus Law Group, PLLC

(57) ABSTRACT

There is provided a display device including a detection section which detects a presence of another display device, and acquires information of a provision source of a function provided by the another display device, a function execution section which executes the function provided by the another display device based on the information acquired from the another display device, a communication section which establishes a connection with the another display device by the execution of the function by the function execution section, and a display section which displays information corresponding to reception, by the communication section, of information of a content provision source specified from content displayed on the another display device with which a connection has been established by the communication section.

10 Claims, 12 Drawing Sheets

(56) References Cited

U.S. PATENT DOCUMENTS

| | | | |
|---|---|---|---|
| 2012/0060197 A1* | 3/2012 | Kitahara et al. | 725/131 |
| 2012/0265621 A1* | 10/2012 | Sechrist | H04N 21/8173 705/14.73 |
| 2013/0152135 A1* | 6/2013 | Hong | H04N 21/4622 725/51 |
| 2014/0115060 A1* | 4/2014 | Kim et al. | 709/204 |
| 2014/0150022 A1* | 5/2014 | Oh | H04N 21/478 725/37 |
| 2014/0359057 A1* | 12/2014 | Hensgen | H04N 21/4126 709/217 |

\* cited by examiner

DISPLAY DEVICE, INFORMATION ACQUISITION METHOD, AND INFORMATION PROVIDING METHOD

CROSS REFERENCE TO RELATED APPLICATIONS

This application claims the benefit of Japanese Priority Patent Application JP 2013-138790 filed Jul. 2, 2013, the entire contents of which are incorporated herein by reference.

BACKGROUND

The present disclosure relates to a display device, an information acquisition method, and an information providing method.

In recent years, with the prevalence of portable terminals such as smart phones and tablet terminals, TV synchronization by a so-called second screen device has been attracting attention. TV synchronization by a second screen device is a process in which a TV is set as a device having a first screen, and a Web page of content synchronized to a program being projected on the TV is displayed on a portable terminal, which is a device having a second screen.

As technology for implementing TV synchronization, there is technology in which an application installed in the portable terminal recognizes audio of content output from the TV, and displays information by setting a recognition result as a key and accessing a server on the Web, (refer to JP 2005-333371A).

SUMMARY

However, when it may be necessary to perform audio recognition at the portable terminal side in order to perform TV synchronization by a second screen device, it may be necessary for the accuracy of the audio recognition to be maintained.

Accordingly, the present disclosure provides a new and improved display device, information acquisition method and information providing method capable of being able to easily synchronize information output by some device and information output by another device.

According to an embodiment of the present disclosure, there is provided a display device including a detection section which detects a presence of another display device, and acquires information of a provision source of a function provided by the another display device, a function execution section which executes the function provided by the another display device based on the information acquired from the another display device, a communication section which establishes a connection with the another display device by the execution of the function by the function execution section, and a display section which displays information corresponding to reception, by the communication section, of information of a content provision source specified from content displayed on the another display device with which a connection has been established by the communication section.

According to another embodiment of the present disclosure, there is provided a display device including a content display section which acquires and displays content, and an information transmission section which transmits information for displaying information related to content displayed by the content display section on another display device in accordance with a request from the another display device. In a case where information of a content provision source of the content to be displayed on the another display device is included in the content displayed by the content display section, the information transmission section transmits the information of the content provision source to the another display device.

According to still another embodiment of the present disclosure, there is provided a display control method including detecting a presence of another display device, and acquiring information of a provision source of a function provided by the another display device, executing the function provided by the another display device based on the information acquired from the another display device, establishing a connection with the another display device by the execution of the function, and displaying information corresponding to reception, from the another display device information, of information of a content provision source specified from content displayed on the another display device with which a connection has been established.

According to yet another embodiment of the present disclosure, there is provided a display control method including acquiring and displaying content, and transmitting information for displaying information related to the content displayed in the step of displaying the content on another display device in accordance with a request from the another display device. In a case where information of a content provision source of the content to be displayed on the another display device is included in the content displayed in the step of displaying and acquiring the content, the information of the content provision source is transmitted to the another display device by the step of transmitting the information.

According to one or more of embodiments of the present disclosure such as described above, a new and improved display device, information acquisition method and information providing method can be provided capable of being able to easily synchronize information output by some device and information output by another device.

DETAILED DESCRIPTION OF THE EMBODIMENT(S)

Figure 1:
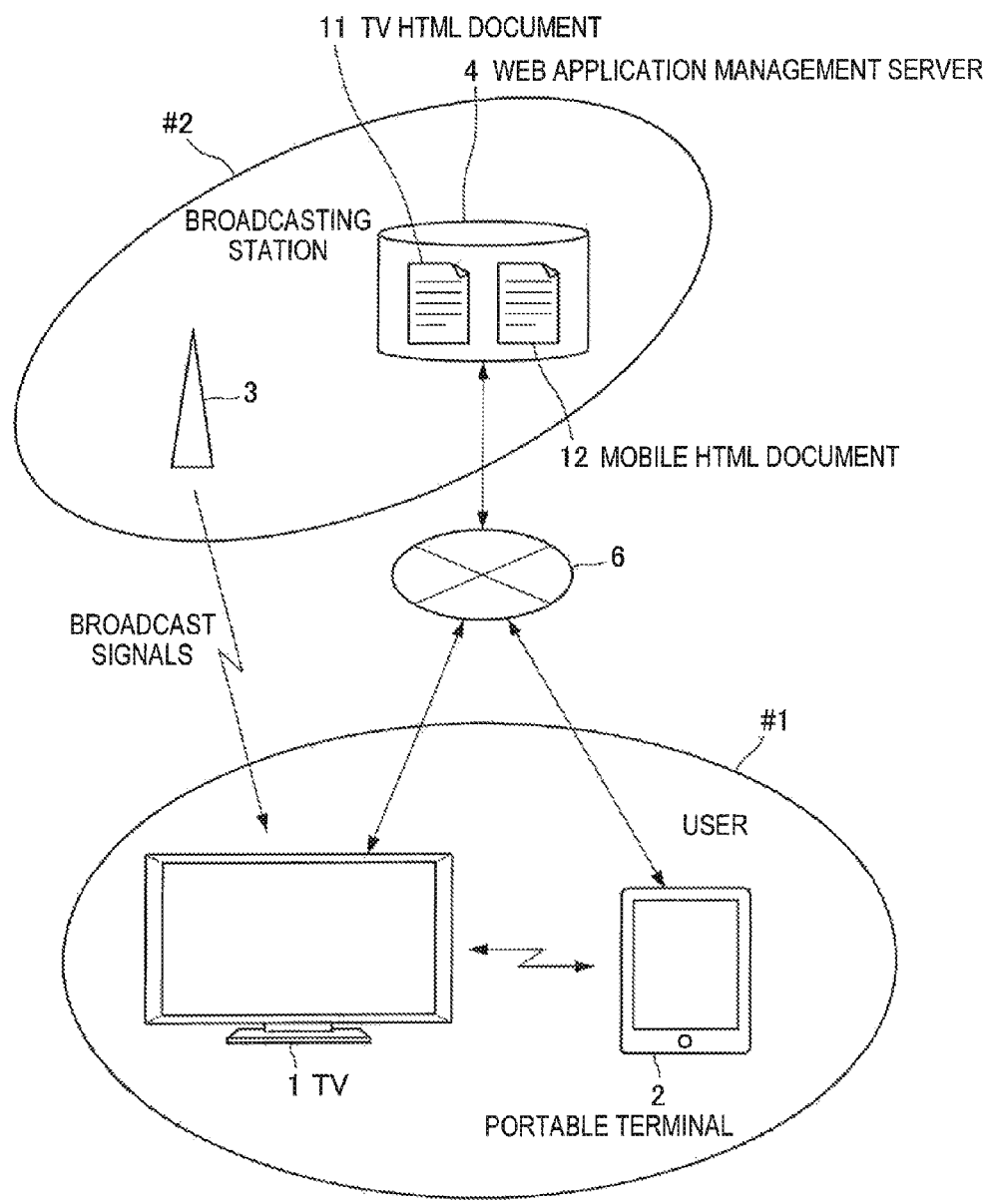
FIG. 1 is an explanatory diagram which shows a configuration example of an information processing system 10 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
<1. An embodiment of the present disclosure>
[System configuration example]
[Procedure for implementing TV synchronization]
[Outline of TV synchronization]
[Hardware configuration example of the TV]
[Functional configuration example of the TV]
[Hardware configuration example of the portable terminal]
[Functional configuration example of the portable terminal]
[Operation examples of the TV and the portable terminal]
<2. Conclusion>

1. AN EMBODIMENT OF THE PRESENT DISCLOSURE

[System Configuration Example]

First, a configuration example of an information processing system according to an embodiment of the present disclosure will be described with reference to the figures. FIG. 1 is an explanatory diagram which shows a configuration example of an information processing system 10 according to an embodiment of the present disclosure. Hereinafter, a configuration example of the information processing system 10 according to an embodiment of the present disclosure will be described by using FIG. 1.

As shown in FIG. 1, the information processing system 10 according to an embodiment of the present disclosure is constituted by including a TV 1, a portable terminal 2, a broadcasting station 3, and a Web application management server 4. The TV 1, the portable terminal 2, and the Web application management server 4 are connected to the internet 6.

The TV 1 and the portable terminal 2 are devices used by a user, such as shown enclosed by the oval #1. The TV 1 receives broadcast signals from the broadcasting station 3, and outputs video and audio of a program broadcast by the broadcasting station 3. The portable terminal 2 is a portable type terminal having a display, such as a smart phone, a tablet terminal or a game machine. The TV 1 will be assumed to be a device having a first screen, and the portable terminal 2 will be assumed to be a device having a second screen (hereinafter, called a "second screen") used by the user.

The portable terminal 2 is a device incorporated with a prescribed OS (Operating System), which executes various applications developed for the OS incorporated in the portable terminal 2. Note that, the OS incorporated in the portable terminal 2 is not limited to that specified in the present disclosure. The TV 1 and the portable terminal 2 not only communicate with a server on the internet 6, but mutually communicate with one other via a network within the home built by a wireless LAN (Local Area Network) or the like.

As shown enclosed by the oval #2 in FIG. 1, the broadcasting station 3 and the Web application management server 4 are managed by a broadcaster. The Web application management server 4 stores a TV HTML (Hyper Text Markup Language) document 11 and a mobile HTML document 12 prepared by the broadcaster for some program broadcast by the broadcasting station 3.

The TV HTML document 11 is acquired by a Web browser incorporated in the TV 1, and is an HTML document for the TV 1 used for screen display or the like. The mobile HTML document 12 is acquired by a Web browser incorporated in the portable terminal 2, and is an HTML for the portable terminal 2 used for screen display or the like. For example, information related to the same program being broadcast is included in the TV HTML document 11 and the mobile HTML document 12.

Not only a description of an HTML, but also a description of a script is included in the TV HTML document 11 and the mobile HTML document 12. For example, this script is described by a language such as JavaScript (registered trademark). The TV HTML document 11 is a Web application executed on the Web browser incorporated in the TV 1, and the mobile HTML document 12 is a Web application executed on the Web browser incorporated in the portable terminal 2. Hereinafter, starting an HTML document will have the meaning of starting a Web application, and executing an HTML document will have the meaning of executing a Web application.

For example, the TV HTML document 11 and the mobile HTML document 12 can perform a display process of a Web page, a process using an API (Application Programming Inter(ace) of a Web browser, or the like based on the description included in the HTML document.

Further, for example, the portable terminal 2 executes a Web application for displaying information, such as a Web page related to a program received by the TV 1, on a Web browser corresponding to an HTML 5. In the description hereinafter, a Web application for displaying information such as a Web page related to a program received by the TV 1, which is executed on the Web browser incorporated in the portable terminal 2, will be called a TV companion application.

In the information processing system 10 according to an embodiment of the present disclosure having such a configuration, TV synchronization is implemented by a second screen device, by using the TV HTML document 11 and the mobile HTML document 12 prepared by a broadcaster as information related to some program.

Note that, while the information processing system 10 which includes the TV 1 and the portable terminal 2 is shown on a user side in FIG. 1, the present disclosure is not limited to such an example. If there is a device, other than the TV 1, which has a configuration capable of receiving broadcast waves from the broadcasting station 3, and capable of notifying information of a Web page to another device, in the case where a Web page is acquired based on the received broadcast waves, and information of a Web page displayed on the another device is included in this Web page, such a device can also be included in the range of the present disclosure. Further, if there is a device, other than the portable terminal 2, which has a configuration capable of displaying a Web page by synchronizing with another device, such a device can also be included in the range of the present disclosure.

Heretofore, a configuration example of the information processing system 10 according to an embodiment of the present disclosure has been described by using FIG. 1. To continue, a procedure for implementing TV synchronization in the information processing system 10 according to an embodiment of the present disclosure will be described.

[Procedure for Implementing TV Synchronization]

Figure 2:
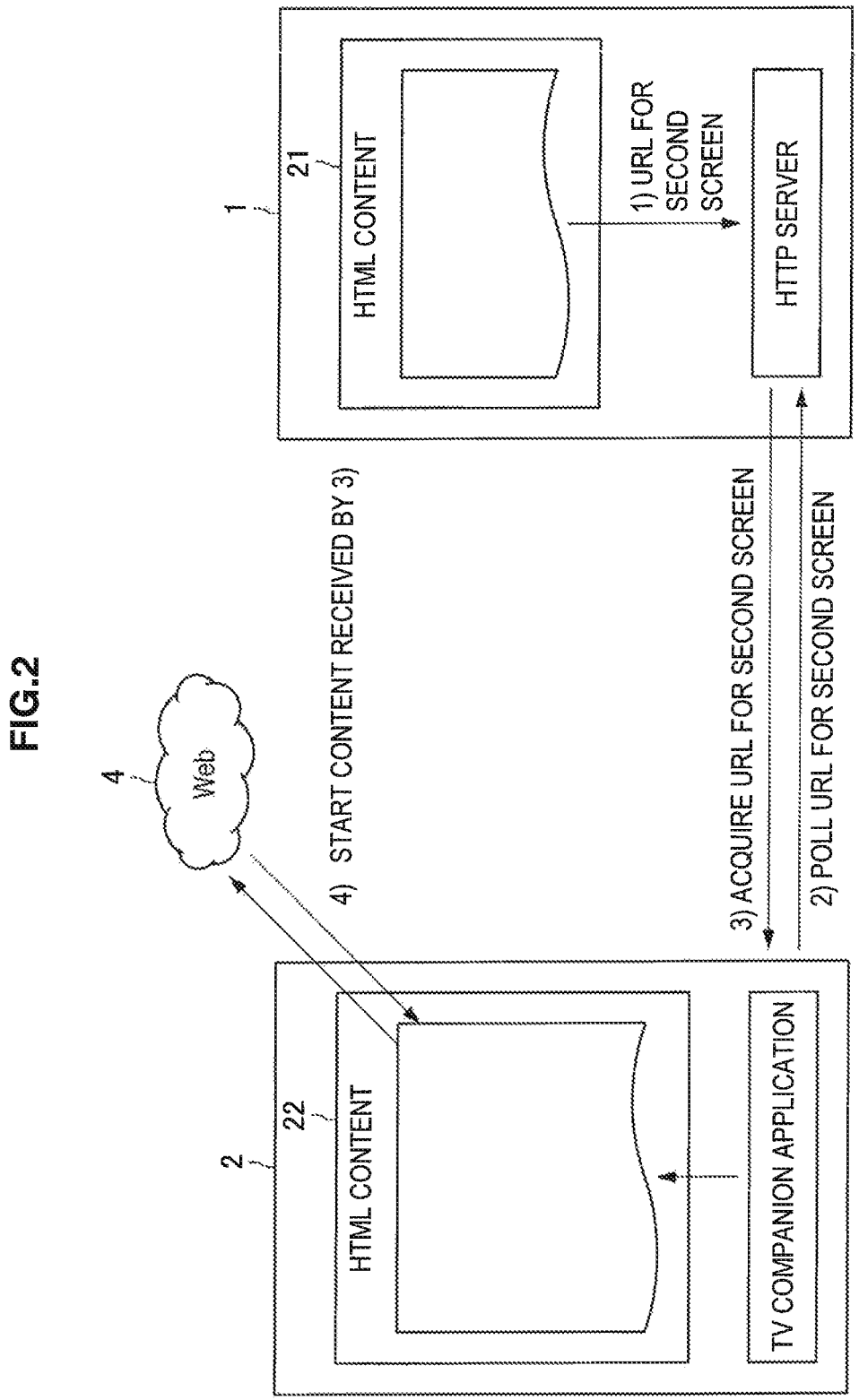
FIG. 2 is an explanatory diagram which shows an example of a procedure for implementing TV synchronization.

FIG. 2 is an explanatory diagram which shows an example of a procedure for implementing TV synchronization. As described above, while the portable terminal 2 according to an embodiment of the present disclosure executes the TV companion application on the Web browser, the example shown in FIG. 2 is an example of a procedure for implementing TV synchronization in the case where the TV companion application is executed separately from the Web browser in the portable terminal 2.

The TV 1 can receive the TV HTML document 11 and execute the TV HTML document 11. When a URL of the mobile HTML document 12 for second screen use is included in this TV HTML document 11, the TV 1 transfers the URL of the mobile HTML document 12 to an HTTP server executed inside the TV 1 (Procedure 1).

The TV companion application executed separately from the Web browser in the portable terminal 2 performs polling, to the HTTP server executed inside the TV 1, for whether or not the URL of the mobile HTML document 12 of second screen use is present (Procedure 2). When the TV companion application executed by the portable terminal 2 acquires the URL of the mobile HTML document 12 from the HTTP server executed inside the TV 1, this URL is transferred to the Web browser (Procedure 3).

Then, the Web browser executed by the portable terminal 2 acquires the mobile HTML document 12 based on the URL acquired from the TV 1 by the TV companion application, and executes the acquired mobile HTML document 12 (Procedure 4).

In this way, by having the TV 1 and portable terminal 2 execute operations based on the above described procedures, a Web page related to a program being received by the TV 1 can be displayed on a display of the portable terminal 2. However, it may be necessary to perform polling from the portable terminal 2 to the TV 1, with this method shown in FIG. 2, for whether or not the URL of the mobile HTML document 12 for second screen use is present. Therefore, in the method shown in FIG. 2, there is a lack in immediacy for the execution of the mobile HTML document 12 by the portable terminal 2, and complications will be generated in the programs executed by the portable terminal 2. Further, it may be necessary to separately prepare the TV companion application executed by the portable terminal 2 to begin with, and this can become a factor in impairing the convenience of a user or being troublesome for the user.

Accordingly, in an embodiment of the present disclosure, the TV companion application is executed on a Web browser of the portable terminal 2. By having the TV companion application executed on a Web browser of the portable terminal 2, immediacy and convenience can be improved.

Figure 3:
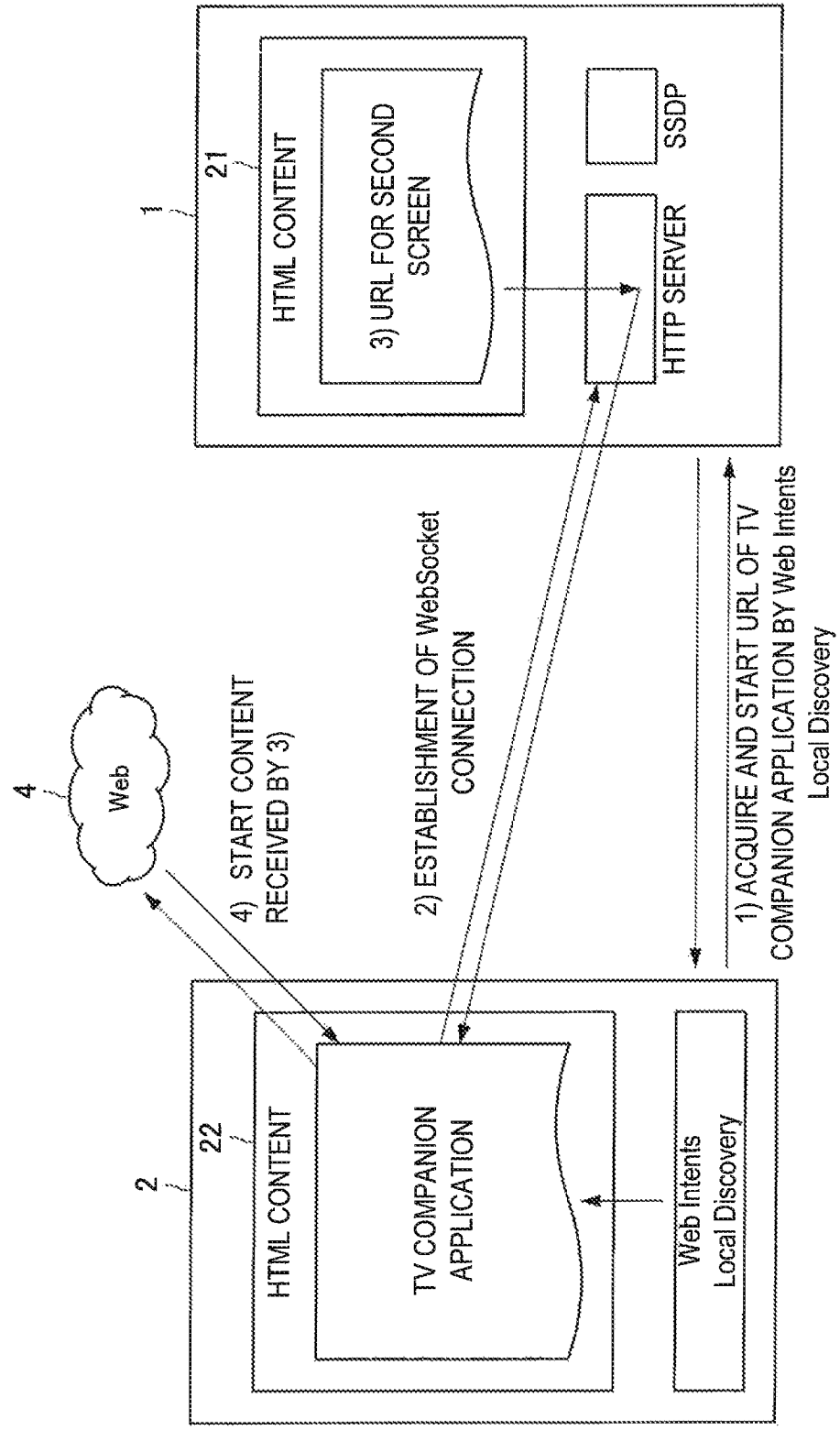
FIG. 3 is an explanatory diagram which shows an example of a procedure for implementing TV synchronization.

FIG. 3 is an explanatory diagram which shows an example of a procedure for implementing TV synchronization. The example shown in FIG. 3 is an example of a procedure for implementing TV synchronization, in the case where the TV companion application is executed by the Web browser in the portable terminal 2.

First, the portable terminal 2 acquires a URL (Uniform Resource Locator) of the TV companion application from an SSDP (Simple Service Discovery Protocol) module included in the TV 1, by Web intents Local Network Service Discovery (Local Discovery). Then, the portable terminal 2 starts the TV companion application, on the Web browser, by accessing the URL acquired from the TV 1 (Procedure 1).

Web Intents Local Network Service Discovery is technology used when searching for a Web service on a network by using a browser, and is technology in which standardization is being undertaken by the World Wide Web Consortium (W3C).

To continue, the portable terminal 2 makes a connection, by the TV companion application started on the Web browser, to the HTTP server executed inside the TV 1 (Procedure 2). The connection from the TV companion application to the HTTP server can be made by using standardized technology such as WebSocket, Long Polling or server-send-event.

As described above, the TV 1 can receive the TV HTML document 11 and execute the TV HTML document 11. When the URL of the mobile HTML document 12 for second screen use is included in this TV HTML document 11, the TV 1 transfers the URL of the mobile HTML document 12 to the HTTP server executed inside the TV 1. The portable terminal 2 acquires the URL of the mobile HTML document 12 via the connection made in the above described Procedure 2 (Procedure 3).

Then, the Web browser executed by the portable terminal 2 acquires the mobile HTML document 12 based on the URL acquired from the TV 1 by the TV companion application started on the Web browser, and executes the acquired mobile HTML document 12 (Procedure 4).

In this way, by having the TV 1 and the portable terminal 2 execute operations such as the above described procedures, a Web page related to a program being received by the TV 1 can be displayed on a display of the portable terminal 2.

To continue, an outline of TV synchronization by the above described second screen device in the information processing system 10 according to an embodiment of the present disclosure will be described.

[Outline of TV Synchronization]

Figure 4:
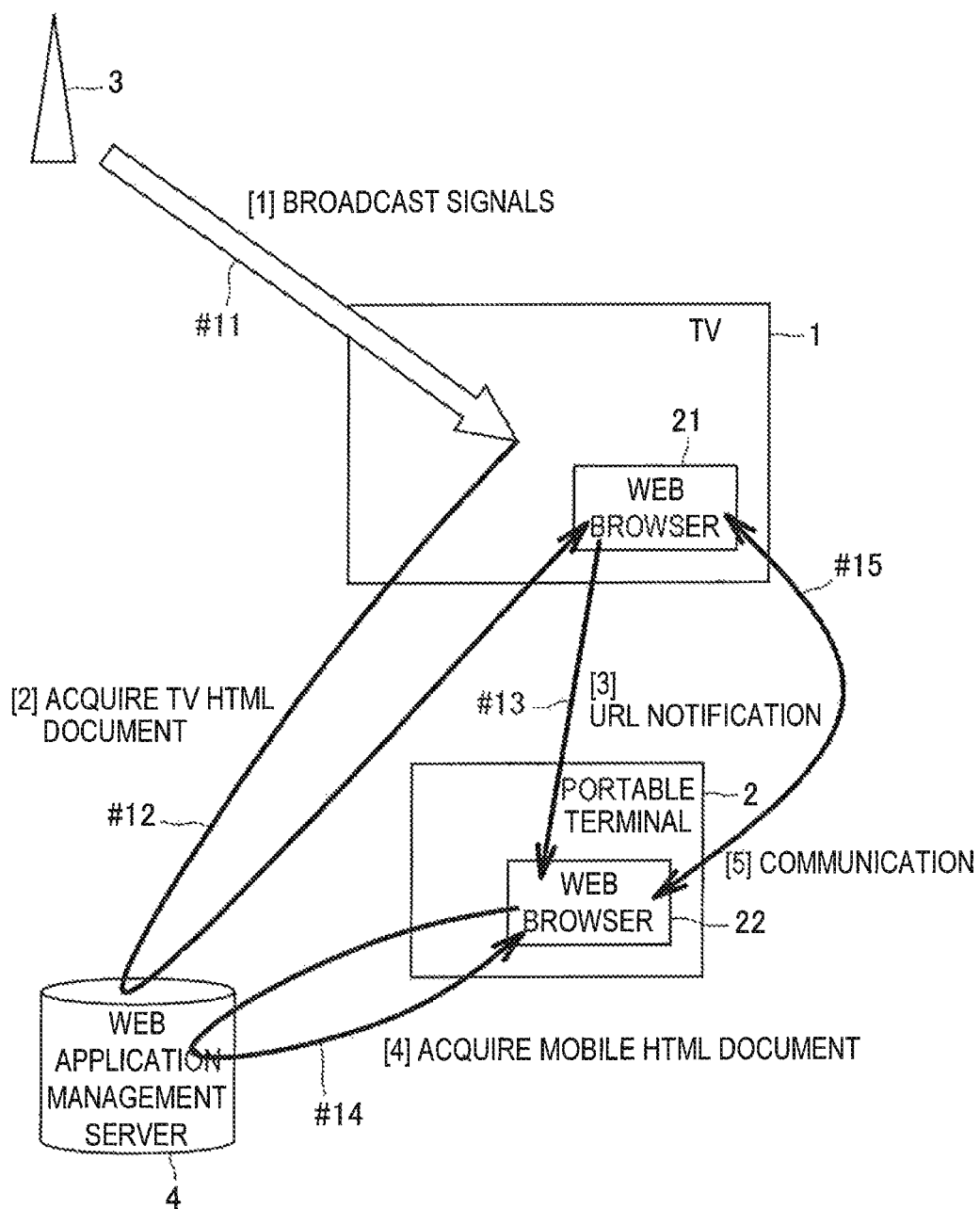
FIG. 4 is an explanatory diagram which shows an outline of TV synchronization in the information processing system 10 according to an embodiment of the present disclosure.

FIG. 4 is an explanatory diagram which shows an outline of TV synchronization in the information processing system 10 according to an embodiment of the present disclosure. Hereinafter, an outline of TV synchronization in the information processing system 10 according to an embodiment of the present disclosure will be described by using FIG. 4.

The TV 1 receives broadcast signals from the broadcasting station 3 such as shown at the tip of arrow #11. An AIT (Application Information Table) is included in the broadcast signals. The AIT is information including data which transmits additional application information for specifying and controlling the application. Also, the AIT is information which is transmitted from the broadcasting station 3 at prescribed time intervals.

The Web browser 21 of the TV 1 accesses the Web application management server 4 based on the URL specified by the AIT, such as shown by the arrow #12 of FIG. 4, and acquires the TV HTML document 11. The URL specified by the AIT shows an address on the Web application management server 4 which is a provision source of the TV HTML document 11.

By having the TV HTML document 11 acquired by the Web browser 21, and having the TV HTML document 11 processed, a Web page related to a program being received is displayed on the TV 1. Further, various processes are performed based on the content described in the TV HTML document 11, in a state in which a Web application is executed by the TV 1.

The URL which shows an address on the Web application management server 4, which is a provision source of the mobile HTML document 12, can be included in the TV HTML document 11. In this way, while the location of the TV HTML document 11 can be included in the broadcast signals from the broadcasting station 3, the URL which shows an address on the Web application management server 4 of the mobile HTML document 12, which is information for the portable terminal 2, is not included.

The TV HTML document 11 executed on the Web browser 21 of the TV 1 notifies the URL of the mobile HTML document 12 to the TV companion application being executed by the Web browser 22 of the portable terminal 2. While the details for the notification of the URL of the mobile HTML document 12 will be described later, a connection made between the HTTP server of the TV 1 and the TV companion application executed by the Web browser 22 of the portable terminal 2 is used for the notification of the URL of the mobile HTML document 12. The TV companion application executed by the Web browser 22 of the portable terminal 2 accesses the Web application management server 4 based on the URL notified from the TV 1, such as show by the arrow #14, and acquires the mobile HTML document 12.

By having the mobile HTML document 12 processed by the TV companion application being executed by the Web browser 22 of the portable terminal 2, a Web page related to the program being received by the TV 1 is displayed on a display of the portable terminal 2. Further, various processes are performed based on the content described in the mobile HTML document 12, in a state in which a Web application is executed by the portable terminal 2.

HTML documents are executed by both the TV 1 and the portable terminal 2, and afterwards communication is performed between the TV HTML document 11 and the mobile HTML document 12, such as shown by the arrow #15. By using communication between HTML documents, information displayed on the portable terminal 2, such as a Web page or VOD (Video On Demand), is switched in synchronization with the progression of the program.

As described above, by having HTML documents executed by both the TV 1 and the portable terminal 2, TV synchronization is implemented for displaying a Web page related to a program being received in the TV 1 on the portable terminal 2.

Heretofore, an outline of TV synchronization in the information processing system 10 according to an embodiment of the present disclosure has been described by using FIG. 4. To continue, an example of screens displayed on the TV 1 and the portable terminal 2 by TV synchronization in the information processing system 10 according to an embodiment of the present disclosure will be described.

[Screen Display Example]

Figure 5:
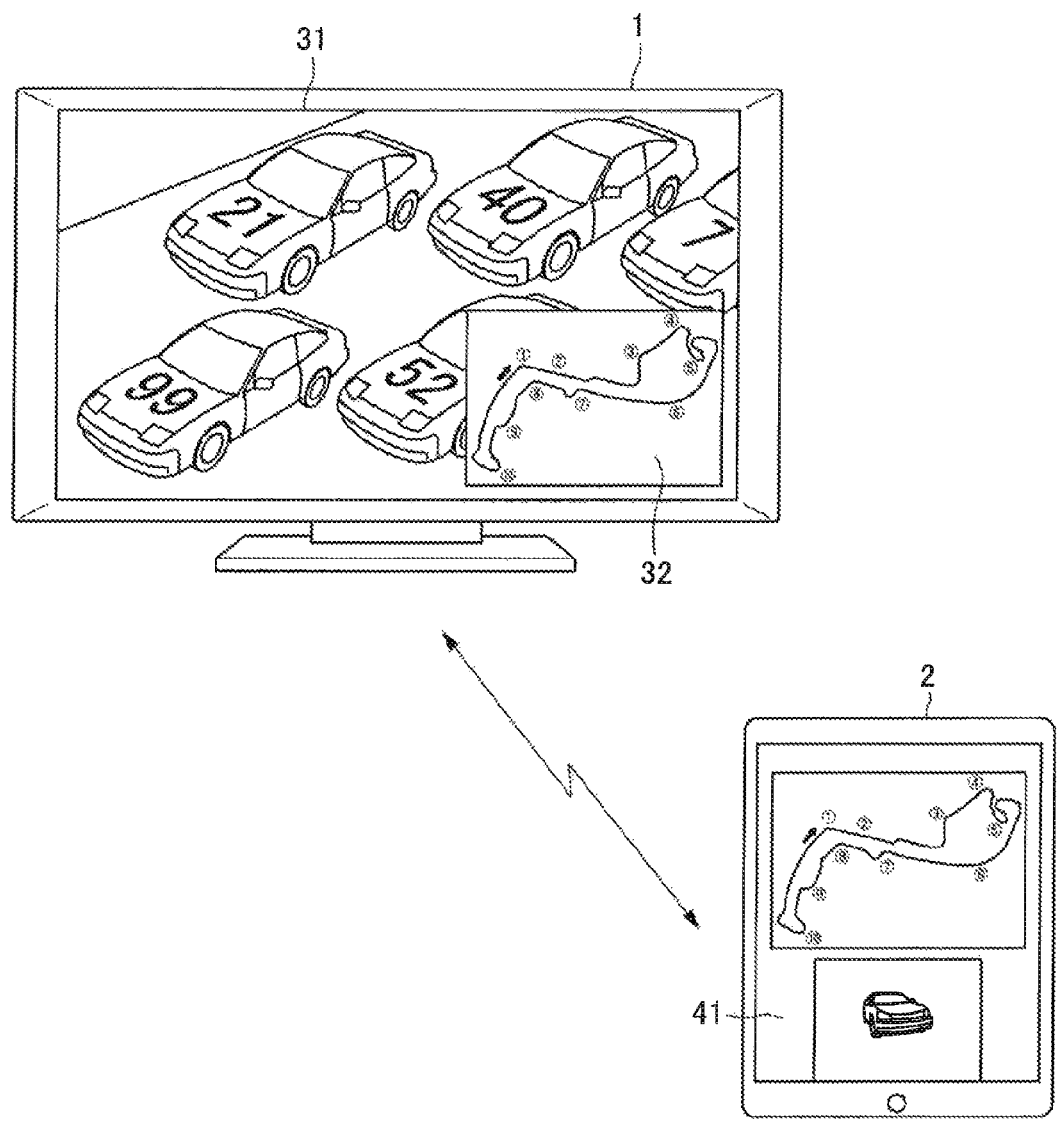
FIG. 5 is an explanatory diagram which shows an example of screens displayed on a TV 1 and a portable terminal 2 by TV synchronization in the information processing system 10 according to an embodiment of the present disclosure.

FIG. 5 is an explanatory diagram which shows an example of screens displayed on the TV 1 and the portable terminal 2 by TV synchronization in the information processing system 10 according to an embodiment of the present disclosure. Hereinafter, an example of screens displayed on the TV 1 and the portable terminal 2 by TV synchronization in the information processing system 10 according to an embodiment of the present disclosure will be described by using FIG. 5.

As an example of a program being broadcast, a video image of some car racing program is displayed on the display 31 of the TV 1. Further, a Web information display region 32 is formed on the lower right of the display 31, and information of the race condition in the car racing program being broadcast is displayed by the Web browser 21. The information displayed in the Web information display region 32 is displayed based on the TV HTML document 11.

On the other hand, information of the race condition in the car racing program being broadcast is displayed, by the TV companion application executed by the Web browser 22, on the display 41 of the portable terminal 2. The information displayed on the display 41 is displayed based on the mobile HTML document 12. As described above, the URL of the mobile HTML document 12 is notified, from the TV HTML document 11 executed by the Web browser 21 of the TV 1, to the TV companion application being executed by the Web browser 22 of the portable terminal 2.

Note that, while an example is shown in FIG. 5 where the Web information display region 32 is formed by being superimposed onto the video image of the car racing program displayed on the display 31 of the TV 1, and information of the race condition in the car racing program being broadcast is displayed by the Web browser 21, the present disclosure is not limited to such an example. The video image of the car racing program and the information of the race condition may be displayed so as not to be superimposed on the display 31 of the TV 1.

Further, only the video image of the car racing program may be displayed on the display 31 of the TV 1, and the information related to the car racing program being broadcast may be displayed on the display 41 of the portable terminal 2. Note that, in the case where only the video image of the car racing program is displayed on the display 31 of the TV 1, the TV HTML document 11 will be executed at the back of this video image of the program.

In this way, in the information processing system 10 of FIG. 1, it becomes possible for an arbitrary Web page desired by a Web application to be displayed on the portable terminal 2 (second screen device), such as a smart phone or a tablet terminal, from this Web application on the TV 1 synchronized with the broadcast. Here, the Web application executed on the TV 1 is created under the responsibility of a broadcaster, and the Web page displayed on the portable terminal 2 (second screen device) is a Web page which the broadcaster has intended to be displayed.

In this way, since it may not be necessary to perform audio recognition or the like at the second screen device side by synchronizing the TV 1 and the portable terminal 2, TV synchronization can be easily implemented. Further, it becomes possible for an initial Web page to be displayed on the second screen device, and afterwards to perform an exchange of arbitrary data between the Web application on the TV and the Web application on the second screen device.

In addition, since the functions normally used by the Web browser of the second screen device are utilized, the above description can be implemented in a form which does not depend on the unit type of the second screen device side. That is, TV synchronization can be implemented regardless of the OS incorporated in the second screen device.

Heretofore, an example of screens displayed on the TV 1 and the portable terminal 2 by TV synchronization in the information processing system 10 according to an embodiment of the present disclosure has been described by using FIG. 5. To continue, a hardware configuration example of the TV 1 will be described.

[Hardware Configuration Example of the TV]

Figure 6:
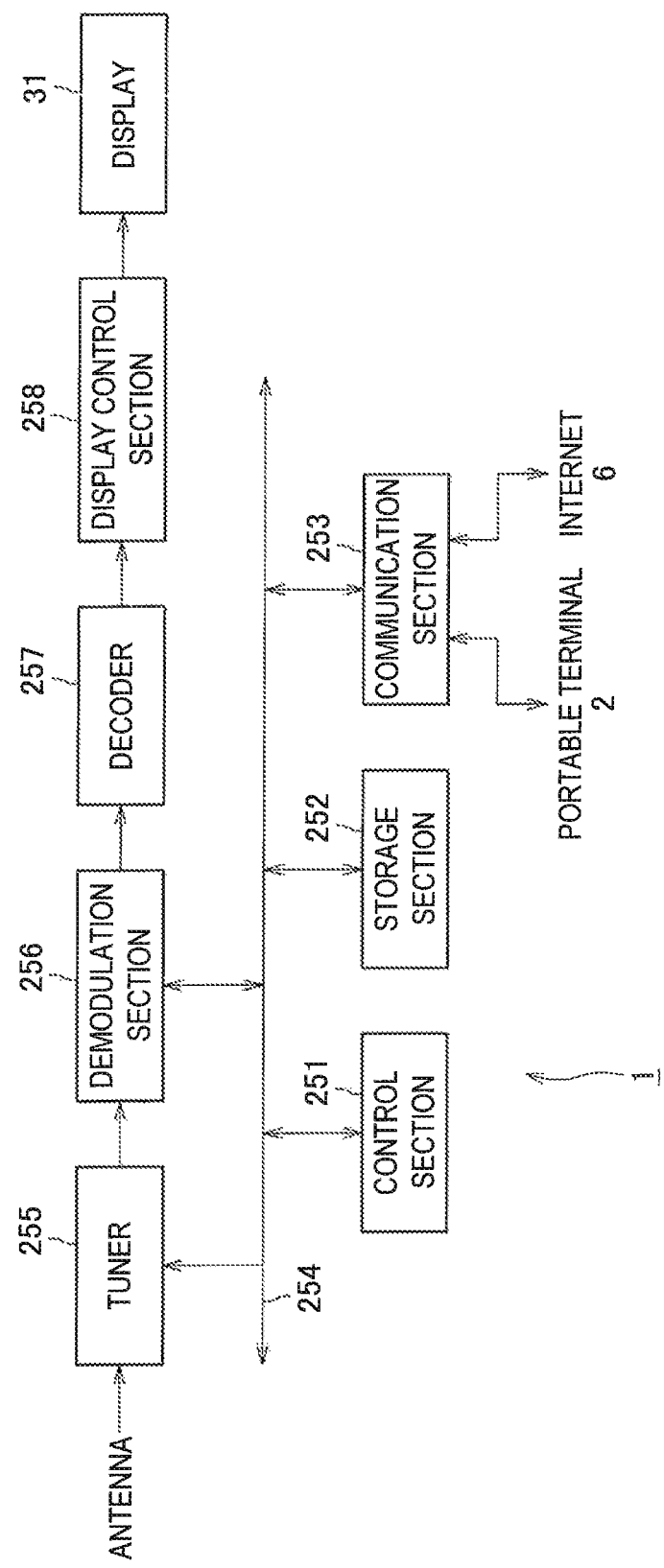
FIG. 6 is an explanatory diagram which shows a hardware configuration example of the TV 1.

FIG. 6 is an explanatory diagram which shows a hardware configuration example of the TV 1 included in the information processing system 10 according to an embodiment of the present disclosure. Hereinafter, a hardware configuration example of the TV 1 will be described by using FIG. 6.

As shown in FIG. 6, the TV 1 is constituted by including a display 31, a control section 251, a storage section 252, a communication section 253, a tuner 255, a demodulation section 256, a decoder 257, and a display control section 258. As shown in FIG. 6, the tuner 255, the demodulation section 256, the decoder 257 and the display control section 258 are connected to the control section 251 via a bus 254. Further, as shown in FIG. 6, the storage section 252 and the communication section 253 are also connected to the bus 254.

The control section 251 implements functions of a TV, by controlling each section of the TV 1 shown in FIG. 6. For example, the control section 251 can be constituted by a CPU (Central Processing Unit), a ROM (Read Only Memory), and a RAM (Random Access memory).

The control section 251 builds a TV platform, which will be described later, by executing programs stored in the ROM, the storage section 252 or the like, and implements functions of a TV by controlling each of the sections of the tuner 255, the demodulation section 256, the decoder 257 and the display control section 258. Further, the control section 251 executes the Web browser 21 on the TV platform, and executes the TV HTML document 11 on the Web browser 21.

The storage section 252 can be constituted, for example, by a hard disk, a flash memory or the like. The storage section 252 stores various programs executed by the control section 251.

The communication section 253 can be constituted by an interface or the like of a wired LAN or a wireless LAN. The communication section 253 communicates with the portable terminal 2, in accordance with a control by the control section 251. Further, the communication section 253 communicates with the Web application management server 4 via the internet 6, in accordance with a control by the control section 251. The communication section 253 outputs the TV HTML document 11 acquired from the Web application management server 4 to the control section 251.

The tuner 255 tunes signals of a prescribed channel from broadcast signals supplied from a broadcasting station, which are received by an antenna (not shown in the figures), and outputs the tuned signals to the demodulation section 256.

The demodulation section 256 applies a demodulation process to the broadcast signals supplied from the tuner 255, and obtains video and audio data of a program. The demodulation section 256 supplies the video and audio data of the program (encoded by a prescribed encoding system) obtained by the demodulation process to the decoder 257. Additional information of the program, such as an AIT, is also acquired in the demodulation section 256. The MT acquired by the demodulation section 256 is supplied to the control section 251.

The decoder 257 decodes the data encoded by a prescribed encoding system, which has been supplied from the demodulation section 256. The decoder 257 outputs decoded video data to the display control section 258. Further, audio data of the program obtained by the decoder 257 is supplied to a speaker (not shown in the figures), and output from the speaker.

The display control section 258 displays a video image of the program on the display 31, based on the video data supplied from the decoder 257. Further, the display control section 258 displays a Web page based on the mobile HTML document 12 on the display 31, in accordance with a control by the control section 251.

Heretofore, a hardware configuration example of the TV 1 has been described by using FIG. 6. To continue, a functional configuration example of the TV 1 will be described.

[Functional Configuration Example of the TV]

Figure 7:
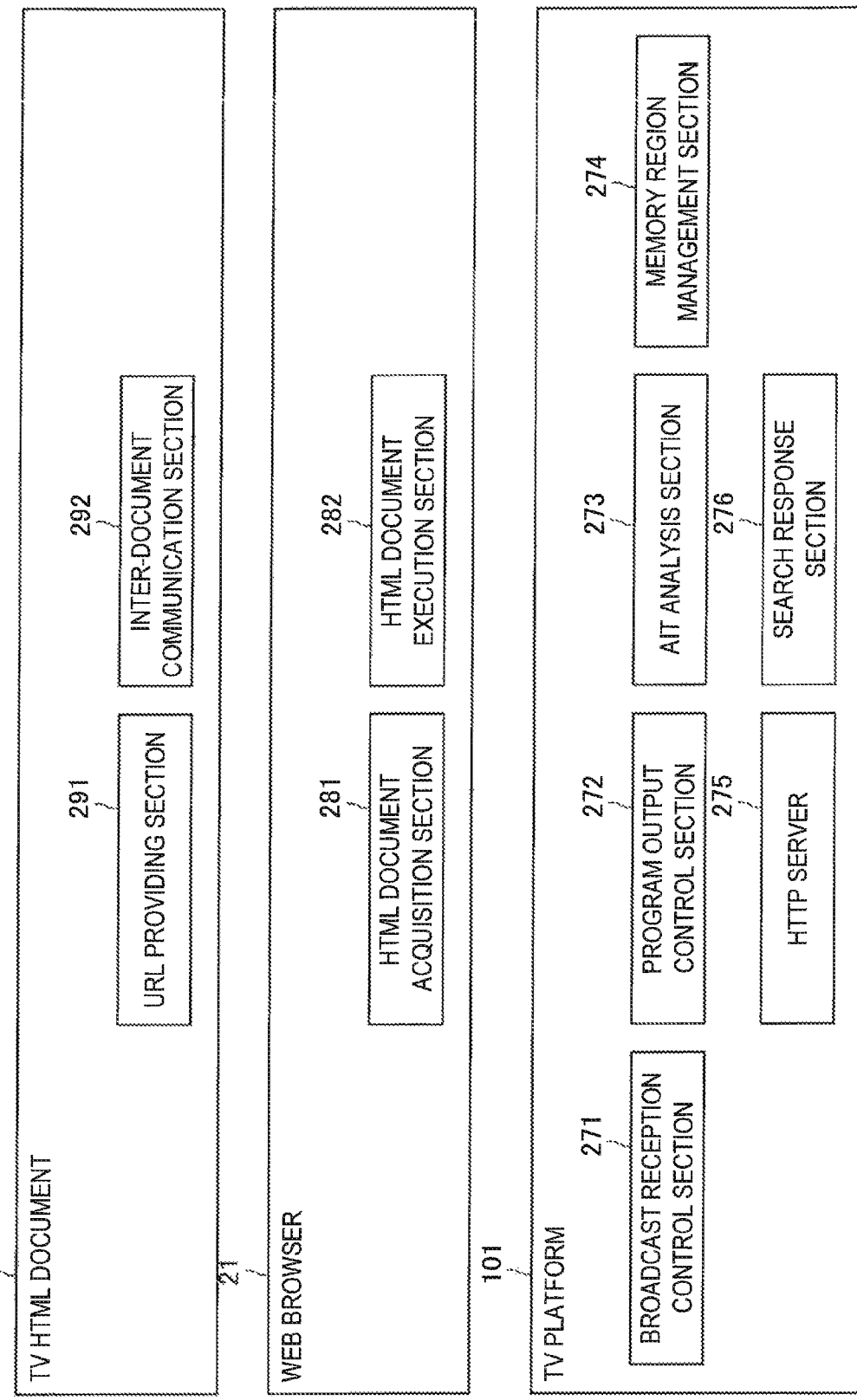
FIG. 7 is an explanatory diagram which shows a functional configuration example of the TV 1.

FIG. 7 is an explanatory diagram which shows a functional configuration example of the TV 1 according to an embodiment of the present disclosure. Hereinafter, a functional configuration example of the TV 1 according to an embodiment of the present disclosure will be described by using FIG. 7.

In the functional configuration example of the TV 1 shown in FIG. 7, at least one part may be implemented by executing a prescribed program by the CPU of the control section 251. As shown in FIG. 7, the TV 1 according to an embodiment of the present disclosure can include a TV platform 101.

The TV platform 101 is a platform built by executing a prescribed program in the TV 1. The TV platform 101 can include a broadcast reception control section 271, a program output control section 272, an AIT analysis section 273, a memory region management section 274, an HTTP server 275, and a search response section 276.

The broadcast reception control section 271 receives broadcast signals of a prescribed channel, by controlling the tuner 255. The program output control section 272 controls the output of a program. For example, the program output control section 272 causes the demodulation section 256 to perform demodulation of broadcast signals, and causes the decoder 257 to perform decoding of video data and audio data of the program. Further, for example, the program output control section 272 controls the display control section 58, and causes the display 31 to display a video image of the program.

The AIT analysis section 273 acquires and analyses an AIT acquired by the demodulation section 256. For example, the AIT analysis section 273 obtains a URL of the TV HTML document 11, by analyzing the AIT. The URL of the TV HTML document 11 obtained by analysis with the AIT analysis section 273 is provided to the Web browser 21.

The memory region management section 274 manages a memory region for status management of the TV 1, which is retained in the RAM or the like of the control section 251, and a specific region set by data to be transmitted to the portable terminal 2. For example, the memory region management section 274 stores a URL of the mobile HTML document 12, to which a URL including an IP address of the TV 1 has been attached by the Web browser 21, in the memory region for status management, and manages the stored URL. Further, the memory region management section 274 stores data transmitted to the portable terminal 2 by inter-HTML document communication in the specific region, and manages the stored data.

The HTTP server 275 executes transmission and reception of data by HTTP with the portable terminal 2. In the present embodiment, the HTTP server 275 makes a connection with the portable terminal 2 by WebSocket, Long polling, Server-send-event or the like, and transmits information to the portable terminal 2 by using this connection.

For example, if the URL of the mobile HTML document 12 is included in the TV HTML document 11, the HTTP server 275 transmits this URL of the mobile HTML document 12 by using the connection made with the portable terminal 2.

The search response section 276 responds to a device search from the portable terminal 2. For example, the search response 276 can be constituted by an SSDP module or the like. The search response section 276 includes a URL of the TV companion application executed by the Web browser 22 of the portable terminal 2, when responding to a device search from the portable terminal 2. The TV companion application executed by the Web browser 22 of the portable terminal 2 is an application provided by the TV 1, and this URL is, for example, a URL of the HTTP server 275 of the TV 1.

The TV platform 101 executes the Web browser 21. An HTML document acquisition section 281 and an HTML document execution section 282 are implemented in the Web browser 21 executed by the TV platform 101.

The HTML document acquisition section 281 acquires the TV HTML document 11 from the Web application management server 4, based on the URL of the TV HTML document 11 obtained by analysis of the MT with the AIT analysis section 273.

The HTML document execution section 282 executes the TV HTML document 11 acquired by the HTML document acquisition section 281. The HTML document execution section 282 can perform display of a Web page related to a program being displayed, by the execution of the TV HTML document 11.

The Web browser 21 executes the TV HTML document 11 acquired from the Web application management server 4. A URL providing section 291 and an inter-document communication section 292 are implemented in the TV HTML document 11 executed by the Web browser 21.

The URL providing section 291 calls a Web application start function, implemented by executing a script (for example, JavaScript) within the TV HTML document 11, by setting the URL included in the TV HTML document 11 as an argument. The URL providing section 291 provides a URL of the mobile HTML document 12 to the TV 1.

The inter-document communication section 292 performs inter-HTML document communication, implemented by executing a script (for example, JavaScript) within the TV HTML document 11, with the mobile HTML document 12 executed by the Web browser 22 of the portable terminal 2. The inter-document communication section 292 calls a function for data transmission, at the time when transmitting data to the portable terminal 2. Further, the inter-document communication section 292 acquires data provided from the HTTP server 275 by calling a function for data reception, at the time when receiving data transmitted from the portable terminal 2.

Heretofore, a functional configuration example of the TV 1 according to an embodiment of the present disclosure has been described by using FIG. 7. To continue, a hardware configuration example of the portable terminal 2 according to an embodiment of the present disclosure will be described.

[Hardware Configuration Example of the Portable Terminal]

Figure 8:
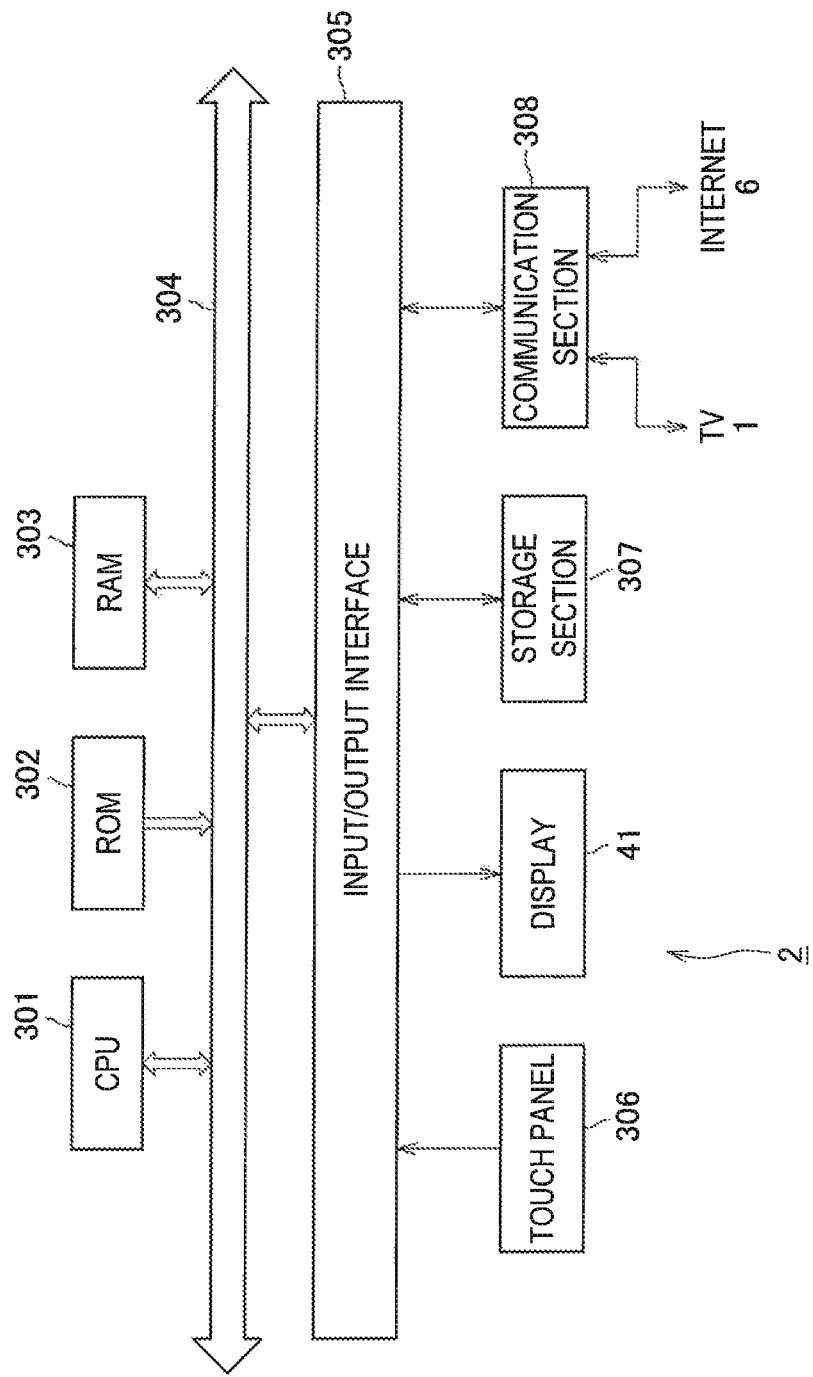
FIG. 8 is an explanatory diagram which shows a hardware configuration example of the portable terminal 2.

FIG. 8 is an explanatory diagram which shows a hardware configuration example of the portable terminal 2 included in the information processing system 10 according to an embodiment of the present disclosure. Hereinafter, a hardware configuration example of the portable terminal 2 will be described by using FIG. 8.

As shown in FIG. 8, the portable terminal 2 is constituted by including a display 41, a CPU 301, a ROM 302, a RAM 303, an input/output interface 305, a touch panel 306, a storage section 307, and a communication section 308. The CPU 301, the ROM 302 and the RAM 303 are mutually connected by a bus 304.

The CPU 301 builds a mobile platform, which will be described later, by executing programs stored in the ROM 302, the storage section 307 or the like, and controls all the operations of the portable terminal 2. Further, the CPU 301 executes the Web browser 22, on the mobile platform, and executes a TV companion application 122 and the mobile HTML document 12 on the Web browser 22.

The touch panel 306 is included, for example, layered on the display 41, and outputs signals which represent the content of operations based on touch operations of a user of the portable terminal 2. The signals output from the touch panel 306 are supplied to the CPU 301.

The storage section 307 is constituted, for example, by a flash memory or the like, and stores various programs executed by the CPU 301. The data stored in the storage section 307 is arbitrarily read by the CPU 301 and is used in the CPU 301.

The communication section 308 is constituted, for example, by an interface of a wireless LAN or the like, and communicates with the TV 1 in accordance with a control by the CPU 301. Further, the communication section 308 communicates with the Web application management server 4 via the internet 6, in accordance with a control by the CPU 301. The communication section 308 communicates with the Web application management server 4 based on the URL of the mobile HTML document 12 acquired from the TV 1, and outputs the mobile HTML document 12 acquired from the Web application management server 4 to the CPU 301.

Heretofore, a hardware configuration example of the portable terminal 2 has been described by using FIG. 8. To continue, a functional configuration example of the portable terminal 2 will be described.

[Functional Configuration Example of the Portable Terminal]

Figure 9:
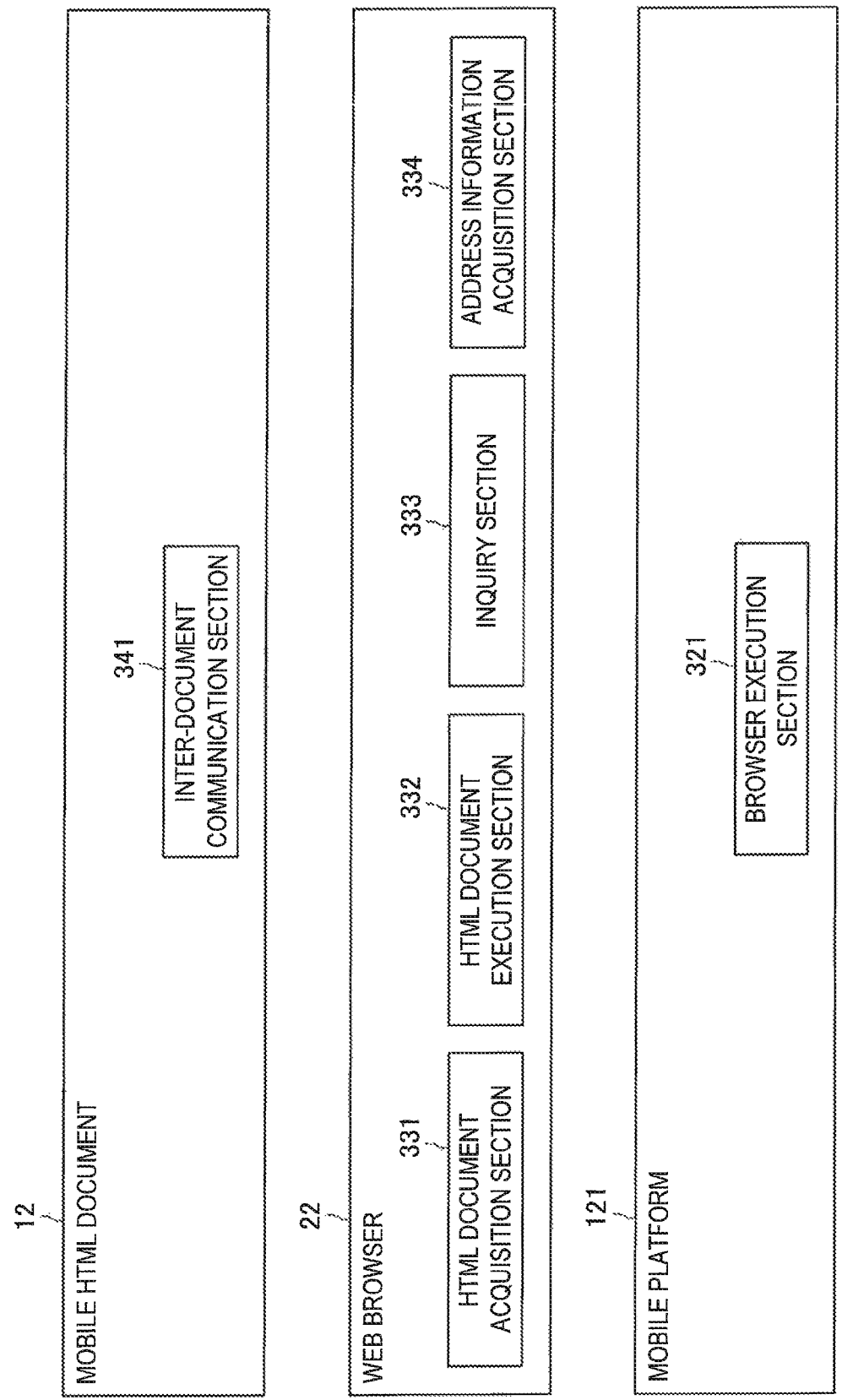
FIG. 9 is an explanatory diagram which shows a functional configuration example of the portable terminal 2.

FIG. 9 is an explanatory diagram which shows a functional configuration example of the portable terminal 2 according to an embodiment of the present disclosure. Hereinafter, a functional configuration example of the portable terminal 2 according to an embodiment of the present disclosure will be described by using FIG. 9.

In the functional configuration example of the portable terminal 2 shown in FIG. 9, at least one part may be implemented by executing a prescribed program by the CPU 301. As shown in FIG. 9, the portable terminal 2 according to an embodiment of the present disclosure can include a mobile platform 121.

The mobile platform 121 is a platform for a portable terminal built by executing a prescribed program in the portable terminal 2. The mobile platform 121 can include a browser execution section 321.

The browser execution section 321 executes the Web browser 22 on the mobile platform 11. Also, the Web browser 22 executed by the browser execution section 321 can implement an HTML document acquisition section 331, an HTML document execution section 332, an inquiry section 333, and an address information acquisition section 334.

The HTML document acquisition section 331 acquires the mobile HTML document 12 from the Web application management server 4, based on the URL of the mobile HTML document 12 acquired from the TV 1 by the address information acquisition section 334, which will be described later. Further, the HTML document acquisition section 331 acquires an HTML document for the TV companion application from the TV 1, based on the URL of the TV companion application acquired from the search response section 276 of the TV 1 by the inquiry section 333.

The HTML document execution section 332 executes the mobile HTML document 12 acquired by the HTML document acquisition section 331. The HTML document execution section 332 can perform display of a Web page related to a program being displayed by the TV 1, by the execution of the mobile HTML document 12.

Further, the HTML document execution section 332 executes the HTML document for the TV companion application acquired by the HTML document acquisition section 331. When the HTML document execution section 332 executes the HTML document for the TV companion application, the HTML document execution section 332 makes a connection with the HTTP server 275 of the TV 1 by WebSocket, Long polling, Server-send-event or the like.

The inquiry section 333 outputs an inquiry of devices capable of being connected. In the present embodiment, the inquiry section 333 outputs an inquiry of devices capable of being connected by using a Web Intents Local Network Service Discovery (Local Discovery). Also, when there is a response to the inquiry from the search response section 276 of the TV 1, and a user specifies the TV 1 as a connection destination of the portable terminal 2, the inquiry section 333 acquires a URL of the TV companion application from the search response section 276. The inquiry section 333 provides the URL of the TV companion application to the HTML document acquisition section 331.

The address information acquisition section 334 acquires a URL of the mobile HTML document 12 from the HTTP server 275 of the TV 1 which has made a connection. Since the address information acquisition section 334 acquires the URL of the mobile HTML document 12, the address information acquisition section 334 may wait for the URL of the mobile HTML document 12 to be sent from the HTTP server 275, without it being necessary to connect to the HTTP server 275 at fixed intervals.

An inter-document communication section 351 is implemented in the mobile HTML document 12. The inter-document communication section 351 performs inter-HTML document communication, implemented by executing a script (for example, JavaScript) within the mobile HTML document 12, with the TV HTML document 11. The inter-document communication section 351 executes an HTTP request for data transmission, at the time when transmitting data to the TV 1. Further, the inter-document communication section 351 executes an HTTP request for data reception, at the time when receiving data transmitted from the TV 1.

Heretofore, a functional configuration example of the portable terminal 2 according to an embodiment of the present disclosure has been described by using FIG. 9. Next, operation examples of the TV 1 and the portable terminal 2 according to an embodiment of the present disclosure will be described.

[Operation Examples of the TV and the Portable Terminal]

Figure 10:
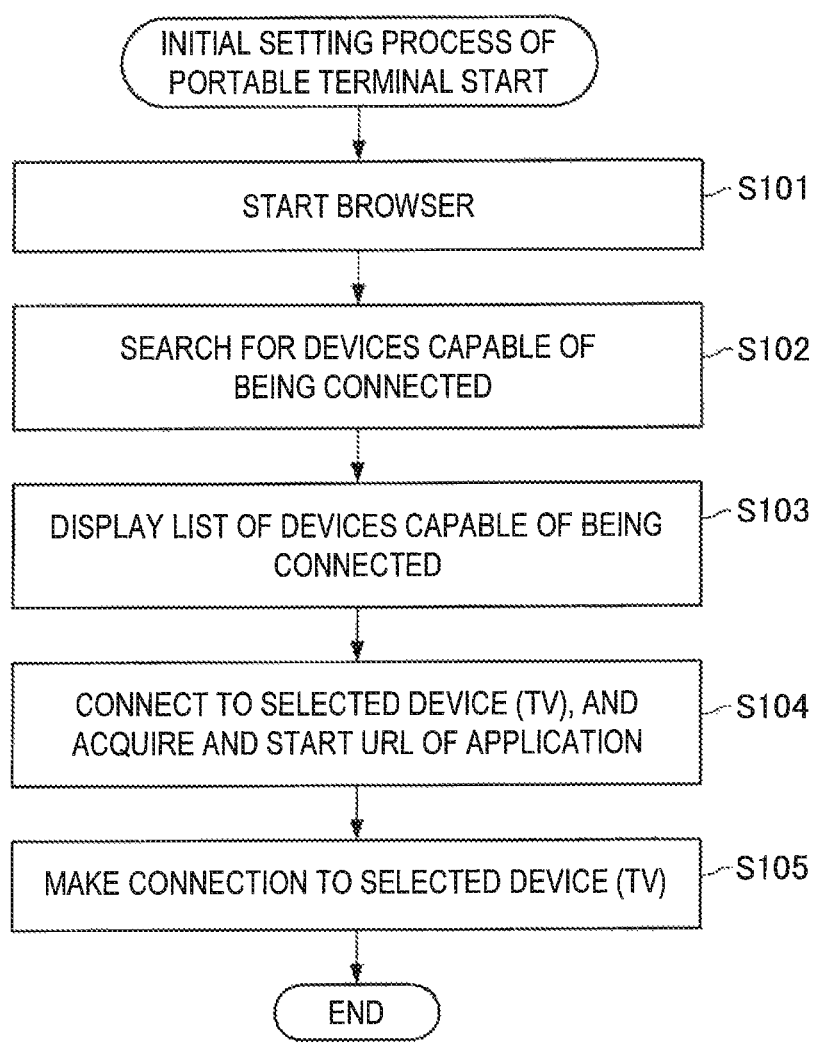
FIG. 10 is a flowchart which shows an operation example of the portable terminal 2.

First, an example of an initial setting process of the portable terminal 2 will be described. FIG. 10 is a flow chart which shows an operation example of the portable terminal 2 according to an embodiment of the present disclosure. Hereinafter, an operation example of the portable terminal 2 according to an embodiment of the present disclosure will be described by using FIG. 10.

When a power source of the portable terminal 2 is turned on, the mobile platform 121 is started by the portable terminal 2. When the mobile platform 121 is started, the mobile platform 121 causes a menu screen of the OS to be displayed on the display 41 of the portable terminal 2.

The mobile platform 121 starts the Web browser 22, in accordance with an icon or the like selected from the menu screen (step S101). Then, when a user instructs a search for devices capable of being connected by using the inquiry section 333 incorporated in the Web browser 22, the Web browser 22 performs a search for devices capable of being connected (step S102). This search of step S102 is performed by having the inquiry section 333 output an inquiry for devices capable of being connected by using a Web intents Local Network Service Discovery (Local Discovery).

For example, the inquiry section 333 broadcasts a device registration acceptance request on a network to which the portable terminal 2 is connected. In the case where there is a device capable of responding on the network, a setting name and IP address of the device are notified, from this device, as a response to the request. Here, a setting name and IP address of the TV 1 are notified from the TV 1 to the portable terminal 2, in accordance with the device registration acceptance request.

To continue, the Web browser 22 causes the display 41 to display a list of devices capable of being connected, which includes the TV 1, found by the search (step S103). When the TV 1 is selected from among the list of devices capable of being connected by the user, the Web browser 22 connects to the TV 1, acquires a URL of the TV companion application from the HTTP server 275 of the TV 1, and starts the TV companion application (Step S104).

When the URL of the TV companion application is acquired and the TV companion application is started, to continue, the Web browser 22 makes a connection with the HTTP server 275 of the TV 1 by using the TV companion application being executed by the Web browser 22 (step S105). As described above, communication technology such as WebSocket, Long polling or Server-send-event can be used to make this connection.

Heretofore, an operation example of the portable terminal 2 according to an embodiment of the present disclosure has been described by using FIG. 10. To continue, an operation example of the TV 1 according to an embodiment of the present disclosure will be described.

Figure 11:
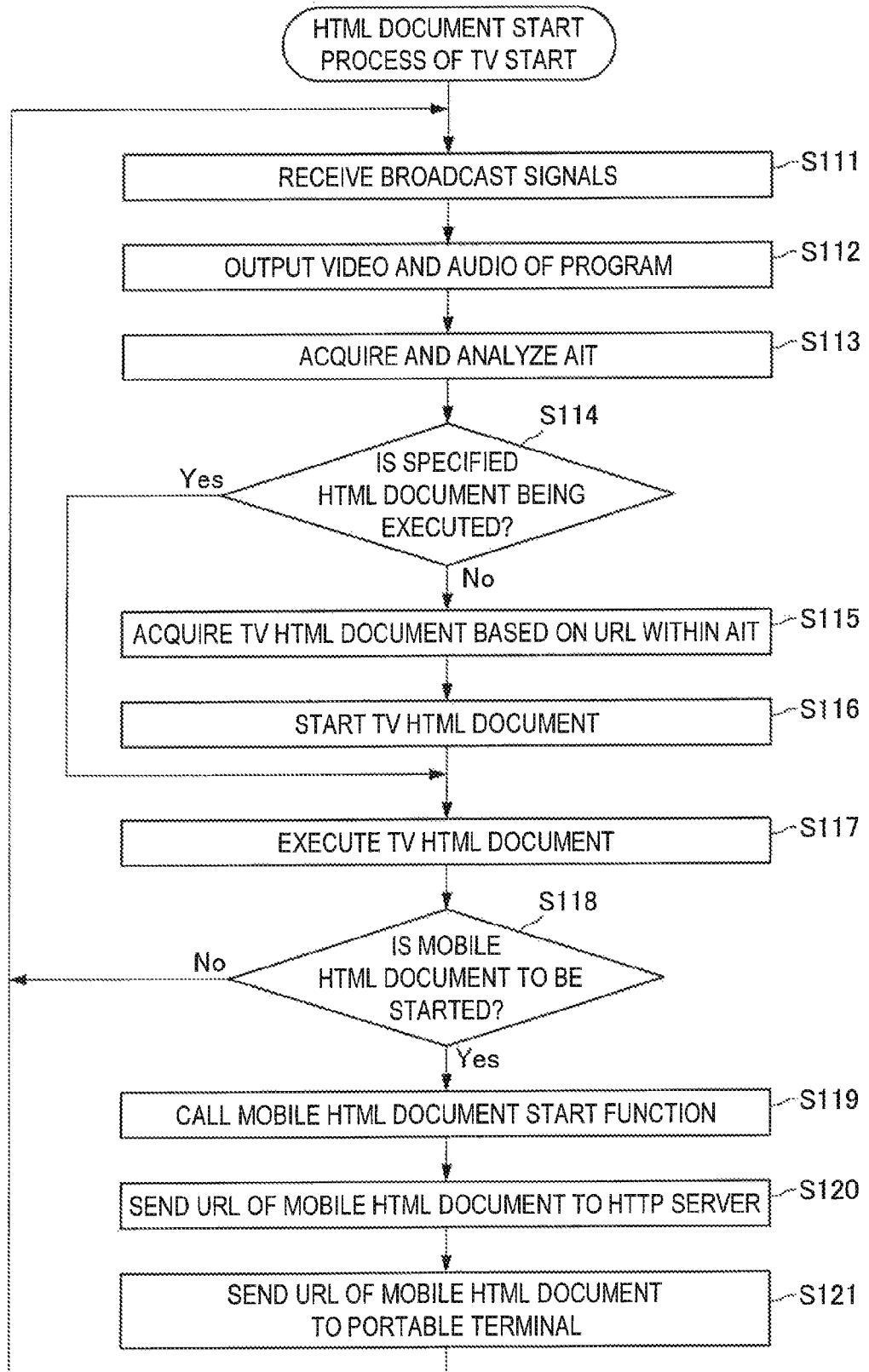
FIG. 11 is a flowchart which shows an operation example of the TV 1.

FIG. 11 is an explanatory diagram which shows an operation example of the TV 1 according to an embodiment of the present disclosure. The example shown in FIG. 11 is an operation example when the TV 1 receives broadcast waves from the broadcasting station 3. The operation example shown in FIG. 11 is in a state where a power source of the TV 1 is already turned on, and the TV platform 101 has started. Hereinafter, an operation example of the TV 1 according to an embodiment of the present disclosure will be described by using FIG. 11.

The TV platform 101 receives broadcast signals of a channel specified by the user (step S111). When the TV platform 101 receives broadcast signals of the channel specified by the user, the TV 1 applies a demodulation process to the broadcast signals, and outputs video and audio of a program, based on video data and audio data obtained by the demodulation process (step S112).

To continue, the TV platform 101 acquires and analyses an AIT included in the broadcast signals as addition information of the program (step S113). It is possible for a plurality of URL of the HTML document to be specified in the AIT, such as a URL of an HTML document (Web application) specified by an auto start flag, or a URL of an HTML document referred to in this HTML document. The TV platform 101 supplies the URL of the TV HTML document 11 obtained by analyzing the AIT from the TV platform 101 to the Web browser 21.

To continue, the Web browser 21 determines whether or not the HTML document specified by the broadcaster is being executed (step S114). When it is determined that the HTML document specified by the broadcaster is not being executed, the Web browser 21 accesses the Web application management server 4 based on the URL obtained by the analysis of the AIT in the above described step S113, and acquires the TV HTML document 11 (S115). When the Web application management server 4 is accessed and the TV HTML document 11 is acquired in step S115, the Web browser 21 starts the TV HTML document 11 acquired from the Web application management server 4 (step S116).

To continue, the Web browser 21 executes the TV HTML document 11 started in the above described step S116 (step S117). The Web browser 21 causes a Web page related to the program to be displayed superimposed on a video image of the program such as show in FIG. 5, for example, based on the description of the HTML included in the TV HTML document 11. The display on the Web browser 21 of a Web page related to the program can be displayed by a control of the display control section 258. Further, the Web browser 21 executes a script (for example, JavaScript) included in the TV HTML document 11, and calls a function specified by the script.

Not that, in step S114, when it is determined that the HTML document specified by the broadcaster is being executed, the Web browser 21 skips the processes of the above described step S115 and step S116, and continues execution of the TV HTML document 11 which has started.

To continue, the Web browser 21 determines whether not there is a description, by the TV HTML document 11 being executed, so as to start the mobile HTML document 12 in the portable terminal 2 (step S118). In the present embodiment, in the case where a script (for example, JavaScript) is included in the TV HTML document 11 which calls a Web application start function, which is a function for starting the mobile HTML document 12, the Web browser 21 determines that the mobile HTML document 12 is to be started in the portable terminal 2.

When it is determined that there is a description so as to start the mobile HTML document 12 in the portable terminal 2, the TV HTML document 11 calls a Web application start function, which is the API of the Web browser 21 (step S119).

In the above described step S119, when the TV HTML document 11 calls a Web application start function, to continue, the Web browser 21 sends the URL of the mobile HTML document 12 to be started by the portable terminal 2 to the IMP server 275 (step S120). When the HTTP server 275 receives the URL of the mobile HTML document 12 to be started by the portable terminal 2 from the Web browser 21, the HTTP server 275 sends the URL of the mobile HTML document 12 to the portable terminal 2 by using the connection made in the above described step S105 (step S121).

Afterwards, the above described processes are repeated, in the Web browser 21, by returning to step S111. For example, the mobile HTML document 12 is started again by the portable terminal 2, and similar to the case in which it is determined in step S118 that the mobile HTML document 12 has not started, the processes of step S111 onwards are repeated.

Heretofore, an operation example of the TV 1 according to an embodiment of the present disclosure has been described by using FIG. 11. To continue, an operation example of the portable terminal 2, which has received a URL of the mobile HTML document 12 from the TV 1, when the TV 1 has sent this URL of the mobile HTML document 12 to the portable terminal 2 in step S121 of FIG. 11, will be described.

Figure 12:
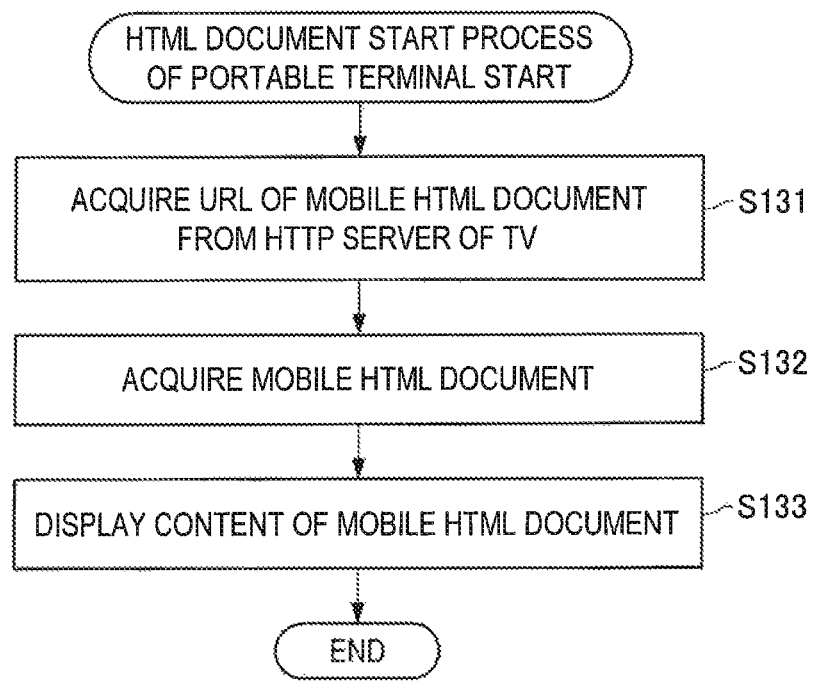
FIG. 12 is a flowchart which shows an operation example of the portable terminal 2.

FIG. 12 is a flow chart which shows an operation example of the portable terminal 2 according to an embodiment of the present disclosure. The example shown in FIG. 12 is an operation example of the portable terminal 2, which has received a URL of the mobile HTML document 12 from the TV 1, when the TV 1 has sent this URL of the mobile HTML document 12 to the portable terminal 2 in step S121 of FIG. 11. Hereinafter, an operation example of the portable terminal 2 according to an embodiment of the present disclosure will be described by using FIG. 12.

The address information acquisition section 334, which functions by the Web browser 22 of the portable terminal 2, acquires the URL of the mobile HTML document 12, which has been send from the HTTP server 275 of the TV 1.

When the URL of the mobile HTML document 12 is acquired, the Web browser 22 accesses the Web application management server 4 based on the URL acquired by the address information acquisition section 334, and acquires and executes the mobile HTML document 12 (step S132). When the mobile HTML document 12 is acquired and executed in step S132, the Web browser 22 causes the display 41 to display a Web page related to the program being displayed by the TV 1, which is content of the mobile HTML document 12 (step S133). The display of the Web page to the Web browser 22 can be executed by a control of the CPU 301.

By having the TV 1 and the portable terminal 2 according to an embodiment of the present disclosure perform operations such as those shown in FIG. 10 to FIG. 12, the TV 1 and the portable terminal 2 will be a state in which the TV HTML document 11 is executed in the TV 1 and the mobile HTML document 12 is executed in the portable terminal 2. For example, the content of the TV HTML document 11 is displayed, along with a video image of the program, on the display 31 of the TV 1, and the content of the mobile HTML document 12 is displayed on the display 41 of the portable terminal 2.

Also, by having the TV 1 and the portable terminal 2 according to an embodiment of the present disclosure perform operations such as those shown in FIG. 10 to FIG. 12, the portable terminal 2 can immediately obtain the URL of the mobile HTML document 12 when the TV 1 obtains the URL of the mobile HTML document 12, and therefore immediacy will be improved.

By having the TV 1 and the portable terminal 2 according to an embodiment of the present disclosure perform operations such as those shown in FIG. 10 to FIG. 12, an operation such that shown below, for example, can be performed.

In the case where the TV 1 is displaying some TV HTML document 11 by the Web browser 21, the TV 1 can display the mobile HTML document 12 by the Web browser 22 of the portable terminal 2, and the content of this mobile HTML document 12 may be the same as the content of the TV HTML document 11. Also, when the TV HTML document 11 displayed by the TV 1 is switched to new content, the portable terminal 2 can be similarly operated, so that the mobile HTML document 12 displayed by the portable terminal 2 is switched to new content.

Further, when new information of a URL of the mobile HTML document 12 is sent from the TV 1, at the time when the portable terminal 2 is displaying the mobile HTML document 12 by the Web browser 22, a display process of the mobile HTML document 12 can be executed based on this newly sent URL, in accordance with a relation between the URL of the mobile HTML document 12 being displayed and the newly sent URL.

For example, if the URL of the mobile HTML document 12 displayed by the Web browser 22 and the newly received URL of the mobile HTML document 12 are a same domain, the portable terminal 2 can operate an that the new mobile HTML document 12 is automatically displayed by the Web browser 22, based on information of the newly received URL.

On the other hand, if the URL of the mobile HTML document 12 displayed by the Web browser 22 and the newly received URL of the mobile HTML document 12 are different domains, the portable terminal 2 can operate so as to present to a user whether or not to display the new mobile HTML document 12 by the Web browser 22, based on information of the newly received URL, without automatically displaying the new mobile HTML document 12 by the Web browser 22.

Further, if the URL of the mobile HTML document 12 displayed by the Web browser 22 and the newly received URL of the mobile HTML document 12 are different domains, the portable terminal 2 can operate so as not to display the new mobile HTML document 12 by the Web browser 22, even if newly receiving the URL.

It is needless to say that even if the URL of the mobile HTML document 12 displayed by the Web browser 22 and the newly received URL of the mobile HTML document 12 are different domains, the portable terminal 2 can operate so as to automatically display the new mobile HTML document 12 by the Web browser 22, based on information of the newly received URL.

2. CONCLUSION

Up to here, an embodiment of the present disclosure has been described by using FIG. 1 to FIG. 12. According to an embodiment of the present disclosure such as described above, by performing synchronization between the TV 1 and the portable terminal 2, when displaying content related to a program being displayed by the TV 1, the portable terminal 2 can immediately obtain a URL of the mobile HTML document 12 to be displayed by the portable terminal 2, which has been acquired by the TV 1. By performing synchronization between the TV 1 and the portable terminal 2, and having the portable terminal 2 immediately obtain a URL of the mobile HTML document 12, immediacy can be improved when displaying content related to a program being displayed by the TV 1.

Note that, in the present disclosure, the system has the meaning of a collection of a plurality of constituent elements (devices, modules (parts) or the like), and whether or not all the constituent elements are within the same housing has not been taken into account. Therefore, the system may be either a plurality of devices, stored in separate housings and connected via a network, or one device in which a plurality of modules are stored within one housing.

Steps in processes executed by devices in this specification are not necessarily executed chronologically in the order described in a sequence chart or a flow chart. For example, steps in processes executed by devices may be executed in a different order from the order described in a flow chart or may be executed in parallel. In addition, in the ease where a plurality of processes is included in one step, the plurality of processes included in this one step can be executed by one apparatus or by allocating a plurality of apparatuses.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A display device including:

a detection section which detects a presence of another display device, and acquires information of a provision source of a function provided by the another display device;

a function execution section which executes the function provided by the another display device based on the information acquired from the another display device;

a communication section which establishes a connection with the another display device by the execution of the function by the function execution section; and a display section which displays information corresponding to reception, by the communication section, of information of a content provision source specified from content displayed on the another display device with which a connection has been established by the communication section.

(2) The display device according to (1), wherein, when the communication section receives information of the content provision source, the display section displays content based on the information of the content provision source.

(3) The display device according to (2), wherein, when the communication section newly receives information of the content provision source, the display section displays content based on the information of the newly received content provision source in accordance with a relation between a provision source of displayed content and the newly received content provision source.

(4) The display device according to (3), wherein, in a case where the provision source of the displayed content and the newly received content provision source have a same domain, the display section automatically displays content based on the information of the newly received content provision source.

(5) The display device according to (3), wherein, in a case where the provision source of the displayed content and the newly received content provision source do not have a same domain, the display section does not automatically display content based on the information of the content provision source even when newly receiving the information of the content provision source.

(6) The display device according to any of (1) to (5), wherein the function execution section executes the function on a Web browser.

(7) A display device including:
a content display section which acquires and displays content; and
an information transmission section which transmits information for displaying information related to content displayed by the content display section on another display device in accordance with a request from the another display device,
wherein, in a case where information of a content provision source of the content to be displayed on the another display device is included in the content displayed by the content display section, the information transmission section transmits the information of the content provision source to the another display device.

(8) The display device according to (7),
wherein the information transmission section transmits the information of the content provision source to be displayed on the another display device to the another display device, the information being included in the content displayed by the content display section.

(9) The display device according to (7) or (8),
wherein the content display section is a Web browser.

(10) A display control method including:
detecting a presence of another display device, and acquiring information of a provision source of a function provided by the another display device;
executing the function provided by the another display device based on the information acquired from the another display device;
establishing a connection with the another display device by the execution of the function; and
displaying information corresponding to reception, from the another display device information, of information of a content provision source specified from content displayed on the another display device with which a connection has been established.

(11) A display control method including:
acquiring and displaying content; and
transmitting information for displaying info nation related to the content displayed in the step of displaying the content on another display device in accordance with a request from the another display device,
wherein, in a case where information of a content provision source of the content to be displayed on the another display device is included in the content displayed in the step of displaying and acquiring the content, the information of the content provision source is transmitted to the another display device by the step of transmitting the information.

(12) A content display system including:
a first display device; and
a second display device,
wherein the first display device includes a content display device which displays second content related to first content, and a content information transmission section which transmits, to the second display device, information for displaying third content related to the first content which is to be displayed on the second display device, and
wherein the second display device includes a communication section which establishes a connection with the first display device based on information transmitted from the content information transmission section, and a content display section which displays the third content based on information specified from the second content displayed by a content display section of the first device with which a connection has been established.

What is claimed is:

1. A display device comprising:
a detection section which detects a presence of another display device, and acquires information from the another display device of a provision source of a function;
a function execution section which executes the function through a web browser, based on the information acquired from the another display device;
a communication section which establishes a connection with the another display device by the execution of the function by the function execution section through the web browser, and receives, from the another display device via the established connection, information of a content provision source; and
a display section which displays content that is obtained from the content provision source based on the information of the content provision received via the established connection,
wherein the information of the content provision source comprises a description of a script and the information of the provision source of the function, and is specified from content displayed on the another display device, and
wherein the detection section, the function execution section, the communication section, and the display section are each implemented via at least one processor.

2. The display device according to claim 1,
wherein, when the communication section receives the information of the content provision source, the display section displays content based on the information of the content provision source.

3. The display device according to claim 2,
wherein, when the communication section newly receives the information of the content provision source, the display section displays content based on the information of the newly received content provision source in accordance with a relation between a provision source of displayed content and the newly received content provision source.

4. The display device according to claim 3,
wherein, in a case where the provision source of the displayed content and the newly received content provision source have a same domain, the display section automatically displays content based on the information of the newly received content provision source.

5. The display device according to claim 3,
wherein, in a case where the provision source of the displayed content and the newly received content provision source do not have a same domain, the display section does not automatically display content based on the information of the content provision source even when newly receiving the information of the content provision source.

6. The display device according to claim 3, wherein, in a case where the provision source of the displayed content and the newly received content provision source do not have a same domain, the display section presents to a user whether or not to display the newly received content.

7. The display device according to claim 1, wherein the information of the provision source of the function comprises a description of an HTML document.

8. A display device comprising:
a content display section, implemented through a web browser, which acquires and displays content; and
an information transmission section which, in accordance with a request from an another display device, transmits to the another display device information of a provision source of a function and information of a content provision source from which content is obtained for display on the another display device, wherein the content obtained for display on the another display device is correlated with the content displayed by the content display section, wherein, in a case where the information of the content provision source from which the content to be displayed on the another display device is obtained is included in the content displayed by the content display section, the information transmission section transmits the information of the content provision source to the another display device, wherein the information of the content provision source comprises a description of an HTML document of the display device, a description of a script and the information of the provision source of the function, and wherein the content display section and the information transmission section are each implemented via at least one processor.

9. A display control method executed using at least one processor, the method comprising:

detecting a presence of another display device, and acquiring information from the another display device of a provision source of a function;

executing, through a web browser, the function based on the information acquired from the another display device;

establishing a connection with the another display device by the execution of the function;

receiving, from the another display device via the established connection, information of a content provision source; and displaying content that is obtained from the content provision source based on the information of the content provision source received via the established connection, wherein the information of the content provision source comprises a description of a script and the information of the provision source of the function, and is specified from content displayed on the another display device.

10. A display control method for sharing screens of a display device, the method executed using at least one processor, the method comprising:

acquiring and displaying content through a web browser; and in accordance with a request from an another display device, transmitting to the another display device information of a provision source of a function and information of a content provision source from which content is obtained for display on the another display device, wherein the content obtained for display on the another display device is correlated with the content displayed through the web browser, wherein, in a case where the information of a content provision source from which the content to be displayed on the another display device is obtained is included in the content displayed in the step of acquiring and displaying the content through the web browser, the information of the content provision source is transmitted to the another display device by the step of transmitting the information to the another display device, and wherein the information of the content provision source comprises a description of an HTML document of the display device, a description of a script and the information of the provision source of the function.

* * * * *